(12) United States Patent
Shimizu et al.

(10) Patent No.: US 10,644,462 B2
(45) Date of Patent: May 5, 2020

(54) CHARGING CONNECTOR, TERMINAL FITTING AND METHOD OF FIXING A SENSOR TO A TERMINAL FITTING

(71) Applicant: Sumitomo Wiring Systems, Ltd., Yokkaichi, Mie (JP)

(72) Inventors: Tooru Shimizu, Bonn (DE); Heiko Schmidt, Cologne (DE)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 16/068,729

(22) PCT Filed: Feb. 9, 2017

(86) PCT No.: PCT/IB2017/000087
§ 371 (c)(1),
(2) Date: Jul. 9, 2018

(87) PCT Pub. No.: WO2017/137826
PCT Pub. Date: Aug. 17, 2017

(65) Prior Publication Data
US 2019/0036278 A1     Jan. 31, 2019

(30) Foreign Application Priority Data

Feb. 11, 2016 (DE) .......................... 10 2016 001 572

(51) Int. Cl.
*H01R 13/66* (2006.01)
*H01R 4/72* (2006.01)

(52) U.S. Cl.
CPC ........... *H01R 13/6683* (2013.01); *H01R 4/72* (2013.01); *H01R 2201/26* (2013.01)

(58) Field of Classification Search
CPC ........................................................ H01R 4/72
USPC ................................................. 439/519, 523
See application file for complete search history.

(56) References Cited

U.S. PATENT DOCUMENTS 2,985,874 A * 5/1961 Williams .................. F21S 8/00
                                                       174/535
4,414,528 A * 11/1983 Bernstein ............. H01H 85/044
                                                       337/187
4,772,225 A *  9/1988 Ulery .................. H01R 13/7195
                                                        29/854

(Continued)

FOREIGN PATENT DOCUMENTS

DE   102014111831 A1 *  2/2016 ......... H01R 13/6683
EP       0 512 927         11/1992
(Continued)

OTHER PUBLICATIONS

International Search Report dated May 4, 2017.
International Preliminary Report on Patentability dated Jan. 8, 2018.

*Primary Examiner* — Oscar C Jimenez
(74) *Attorney, Agent, or Firm* — Gerald E. Hespos; Michael J. Porco; Matthew T. Hespos (57) ABSTRACT

A charging connector for charging a battery installed in a vehicle includes a housing (51) with at least one accommodating chamber (64a) for at least partly accommodating at least one terminal fitting (10), and at least one sensor (S) mounted to at least one terminal fitting (10) by a shrinking tube (20). A corresponding method and a corresponding terminal fitting (10) also are provided.

5 Claims, 12 Drawing Sheets

(56) References Cited

U.S. PATENT DOCUMENTS

| | | | | |
|---|---|---|---|---|
| 4,907,623 | A | * | 3/1990 | Kinney .................... H01R 4/72 138/103 |
| 5,194,692 | A | * | 3/1993 | Gallusser ................. H01R 4/72 156/48 |
| 5,458,508 | A | * | 10/1995 | Sawada .............. H01H 36/0033 335/205 |
| 2006/0105602 | A1 | * | 5/2006 | Akino .................. H01R 13/514 439/218 |
| 2009/0253309 | A1 | * | 10/2009 | Didier ................. H01R 13/512 439/686 |
| 2013/0210255 | A1 | * | 8/2013 | Uchiyama .............. H01R 13/52 439/271 |
| 2016/0111831 | A1 | | 4/2016 | Kawai et al. |
| 2017/0229820 | A1 | * | 8/2017 | Fuehrer ............. H01R 13/6683 |

FOREIGN PATENT DOCUMENTS

| | | |
|---|---|---|
| EP | 2 390 959 | 11/2011 |
| EP | 2 942 840 | 11/2015 |
| JP | 2015-53395 | 3/2015 |
| WO | 02/13330 | 2/2002 |
| WO | 2014/208654 | 12/2014 |

\* cited by examiner

CHARGING CONNECTOR, TERMINAL FITTING AND METHOD OF FIXING A SENSOR TO A TERMINAL FITTING

BACKGROUND

Field of the Invention

The invention relates to a charging connector for charging a battery installed in a vehicle, in particular for an electric driven vehicle or a hybrid vehicle. Further, the invention relates to a terminal fitting to be applied in a charging connector and to a method of fixing a sensor to a terminal fitting.

Description of the Related Art

Electric vehicles contribute to cleaner air in cities because they produce no harmful emissions. An electric vehicle (EV) recharged from the US grid electricity in 2008 emits about 115 grams of $CO_2$ per kilometer, whereas a conventional US-market gasoline powered car emits about 250 grams of $CO_2$ per kilometer. The concept "Vehicle to Grid" provides electric cars and hybrid vehicles as an energy reservoir for the public power grid. In this concept, vehicles are parked most of the time in their life, and may be used as an energy source and accumulator to compensate for peak loads in the public power grid. This concept however, requires a reliable electric connection of the vehicles with the public power grid, even under wet and hot/cold weather conditions of the parking space where the vehicle is parked.

Charging connectors for charging a vehicle-side battery installed e.g. in a hybrid vehicle or an electric vehicle are known. In these known connector systems, a vehicle-side connector is mounted fixedly in or at the vehicle and is connected with the battery of the vehicle. A charging connector provided at an end of an external charging cable may be connected with the vehicle-side connector to provide an electric connection between an external power source and the battery installed within the vehicle for charging the battery of the vehicle via the external charging cable from the external power source.

A locking portion on the charging connector is locked to a lock-receiving portion of the vehicle-side connector to hold the charging connector connected to the vehicle-side connector while charging is performed. After charging is completed, an unlocking portion is pushed to cancel the locked state of the locking portion and the lock-receiving portion so that the charging connector can be separated from the vehicle-side connector.

High currents may flow when charging the battery. Thus, the charging connector and a wire might get hot. A high temperature of the wire and the charging connector increase an electric resistance and might even damage the charging connector or the wire or other components. Accordingly, a charging current might be restricted to a low current to avoid such high temperatures. However, restricting the charging current to a low value extends a charging time and decreases operational convenience of the vehicle.

Accordingly, there is a need to improve this situation. In particular, it is an object to allowing a reliable measurement of conditions prevailing at a connector to particularly allow for a short charging time when applying high currents while avoiding problematic conditions (such as excessively high temperatures) during charging.

SUMMARY

A first aspect of the invention relates to a charging connector for charging a battery installed in a vehicle. The charging connector includes a housing comprising at least one accommodating chamber for at least partly accommodating at least one terminal fitting, and at least one sensor mounted to at least one terminal fitting. The sensor is placed into a mounting bracket, sleeve or clamp that is/can be prefixed to an outer surface of the terminal fitting. The sensor then is mounted and affixed to the terminal fitting by means of at least one shrinking tube.

Mounting the sensor to the terminal fitting by at least one shrinking tube enables a condition of the terminal fitting, such as a temperature, vibration and/or humidity, to be detected precisely in an easy and reliable manner. In other words, the sensor is in abutment or contact with the terminal fitting such that the close disposition of the sensor and/or the direct contact of the sensor with the terminal fitting by means of the shrinking tube leads to a precise and reliable detection of the condition of the terminal fitting. Moreover, the shrinking tube allows easy mechanically affixation of the sensor to the terminal fitting thereby allowing a good direct or indirect coupling thereof to the terminal fitting to achieve a reliable sensing by the sensor.

The direct contact or close positioning of the sensor may be performed easily by the application or use of the shrinking tube. In particular, the terminal fitting is placed together with the sensor within shrinking tube prior to shrinking. The shrinking tube then is heated to reduce a dimension or diameter thereof, such that the sensor is fixed or mechanically positioned onto the terminal fitting, and preferably onto an outer surface thereof.

The shrinking tube may also ensure the proper insulation of the portion of the terminal fitting bearing the sensor, such as electrical insulation, insulation against humidity or water and the like. In other words, the shrinking tube provides good electrical insulation and/or protection from dust, solvents and other foreign materials. The shrinking tube also provides mechanical strain relief because the sensor is held mechanically in place on the terminal fitting by the tight fit of the shrinking tube.

The charging connector further may comprise at least one thermal coupling member for mounting the sensor to the terminal fitting. Accordingly, a good thermal coupling between the terminal fitting and the sensor can be achieved by increasing the surface and/or mass achieving the thermal heat transfer to the sensor, thereby improving the measuring accuracy of the sensor, such as a temperature sensor. This may be specifically useful in a context of DC charging of electric or hybrid vehicles in which high currents (e.g. currents exceeding about 125 A, particularly exceeding about 200 A) flow through the charging connector. Accordingly, reliable detection of the temperature of the terminal fitting is possible when high currents flow therethrough, so that a reliable temperature control can be performed and, thus, overheating can be detected efficiently and safely.

The thermal coupling member may comprise at least one of a sleeve, a mounting bracket and a clamp. Further, the thermal coupling member having the sensor at least partly arranged therein is fixed or mounted to the terminal fitting by the at least one shrinking tube.

The sensor may be arranged at least partly in or by means of at least one of the sleeve, the mounting bracket and the clamp. Additionally, the sleeve, mounting bracket and/or clamp may be fixed or mounted to the terminal fitting by the at least one shrinking tube. More specifically, the sensor may be placed into a sleeve or a mounting bracket or a clamp and the sleeve, mounting bracket or clamp may be fixed to the terminal fitting by the shrinking tube. The sleeve, mounting bracket or clamp may protect the sensor when applying the shrinking tube and when inserting the terminal fitting into the accommodating chamber of the connector housing.

Accordingly, a particularly effective and simple mounting of the sensor to the terminal fitting can be achieved, while ensuring a proper (e.g. thermal) coupling to the terminal fitting.

The thermal coupling member (particularly the sleeve, mounting bracket and/or clamp) may be made of a material (particularly a metal such as Cu) having good thermal conductivity, such that the mounting bracket, sleeve or clamp may increase a heat dissipation from the terminal fitting towards the sensor so as to improve the detection of the terminal fittings condition.

The sensor may be placed at least partly into a clamp that can be fixed to an outer surface of the terminal fitting. By fixing the clamp to an outer surface of the terminal fitting before applying the shrinking tube, a prefixing of the sensor may be achieved. Accordingly, manufacturing of the charging connector is facilitated and a positioning failure of the sensor may be avoided.

The invention also relates to a method of fixing a sensor to a terminal fitting. The method may be used in connection with a method of producing the above-described charging connector. The method may include the steps of:

placing the sensor into a mounting bracket, sleeve or clamp, prefixing the mounting bracket, sleeve or clamp to an outer surface of the terminal fitting, placing at least one shrinking tube over or on said outer surface and the sensor, and heating the shrinking the at least one tube such that the diameter of the at least one shrinking tube decreases to fix the sensor on the outer surface of the terminal fitting.

According to a particular embodiment, the method further comprises a step of thermally coupling the sensor to the terminal fitting by means of a thermal coupling member, particularly by placing said sensor in the thermal coupling member before placing or mounting it on the outer surface of the terminal fitting.

The invention also relates to a terminal fitting comprising a wire connection portion (particularly comprising a crimping, welding and/or soldering part) to be connected with a wire, a connecting part to be connected with a mating terminal fitting, and a sensor mounted on an outer surface of the terminal fitting by means of a mounting bracket, sleeve or clamp and at least one shrinking tube.

According to a particular embodiment, the terminal fitting may further comprise at least one thermal coupling member for mounting said sensor to the terminal fitting.

Accordingly, a good thermal coupling between the terminal fitting (particularly its outer surface) and the sensor can be achieved by increasing the surface and/or mass achieving the thermal heat transfer to the sensor, thereby improving the measuring accuracy of the sensor (particularly of a temperature sensor).

The sensor may be placed at least partly onto an outer surface of the wire connection portion, particularly the crimping, welding and/or soldering part.

The terminal fitting may further comprise a groove in said wire connection portion (particularly said crimping, welding and/or soldering part). The groove may extend substantially along an axial direction of the terminal fitting. The groove may fulfil a double function, i.e. crimping of the wire and positioning of the sensor on the outer surface of the terminal fitting.

The sensor may be a temperature sensor, such as a NTC sensor or a PTC sensor or a PT sensor.

These and other objects, features and advantages of the invention will become more apparent upon reading of the following detailed description and accompanying drawings. It should be understood that even though embodiments are described separately, single features thereof may be combined to additional embodiments.

BRIEF DESCRIPTION OF THE DRAWINGS

FIGS. 1a and 1b are cross sectional views of a terminal fitting of a charging connector according to a first embodiment, wherein

FIGS. 2a and 2b are cross sectional views of a terminal fitting of a charging connector according to a second embodiment, wherein

FIGS. 4a and 4b are cross sectional views of a terminal fitting of a charging connector according to a third embodiment, wherein

FIGS. 6a and 6b are a cross sectional views of a terminal fitting of a charging connector according to a fourth embodiment, wherein

FIGS. 8a and 8b are cross sectional views of a terminal fitting of a charging connector according to a fifth embodiment, wherein

FIGS. 10a and 10b are cross sectional views of a terminal fitting of a charging connector according to a sixth embodiment, wherein

DETAILED DESCRIPTION

Hereinafter, particular embodiments of the invention are described with reference to the accompanying drawings. The following embodiments are specific examples of the invention and are not meant to limit the technical scope of the invention as defined in the claims.

Figure 1A:
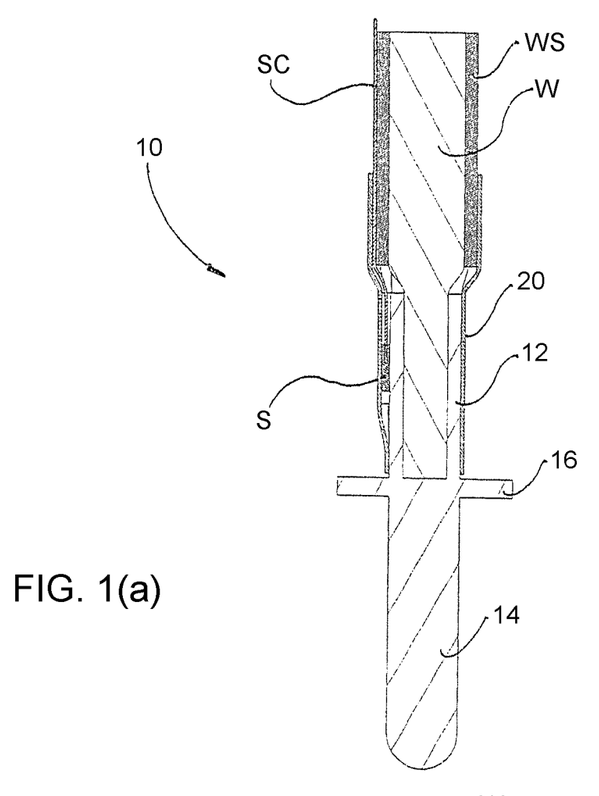
FIG. 1a is a cross sectional view along a longitudinal axis of the terminal fitting and FIG. 1b is a cross sectional view perpendicular to the longitudinal axis of the terminal fitting.
Figure 1B:
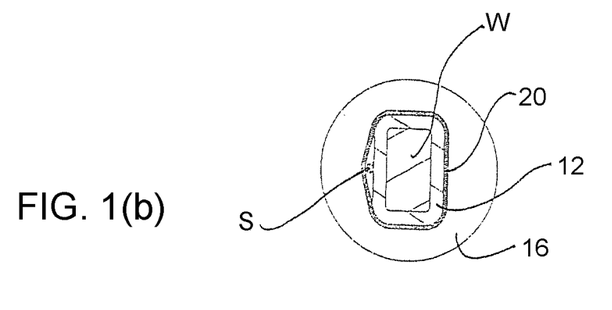

A first embodiment will be described with reference to FIGS. 1a and 1 b. FIG. 1a is a longitudinal cross-sectional view of a terminal fitting 10 comprising a sensor S. FIG. 1b is a cross-sectional view of the terminal fitting 10 perpendicular to a longitudinal axis of the terminal fitting 10 in the area of the sensor S.

As shown in FIG. 1, the terminal fitting 10 comprises wire connection portion (particularly comprising at least one crimping, welding and/or soldering part 12) at or near a back side of the terminal fitting 10 so as to connect the terminal fitting 10 with a wire W of a cable. To connect the wire W with the terminal fitting 10, a wire sheathing WS is removed e.g. at a tip part of the wire W. The exposed wire W arranged at the wire connection portion is inserted into the crimping, welding and/or soldering part 12 of the terminal fitting 10. Subsequently, the arranged (inserted) part of wire W is electrically connected to the wire connection portion, particularly crimped, welded or soldered within the crimping, welding and/or soldering part 12 and/or the crimping, welding and/or soldering part 12 is crimped onto the wire W so as to establish the (particularly electric) connection between the wire W of the cable and the terminal fitting 10.

The terminal fitting 10 further comprises a connecting part 14 at or near a front portion thereof. This connecting part 14 is connected or connectable with a mating terminal fitting of a mating connector (not shown). In this embodiment, the connecting part 14 is a male terminal fitting part, however, the invention is not limited to a male terminal fitting, but may also be applied to a female terminal fitting.

At least one stopper 16 limits an insertion of the connecting part 14 into the mating terminal fitting.

At least one sensor S, such as a humidity, vibration and/or temperature sensor S is placed on an outer surface of the terminal fitting 10, particularly on or near the wire connection portion (particularly the crimping, welding and/or soldering part 12). The sensor S is connected to a sensor cable SC extending towards the backside and towards and/or along the cable of the terminal fitting 10. The sensor S is fixed or mounted mechanically onto the terminal fitting 10, particularly the outer surface of the crimping, welding and/or soldering part 12, by means of at least one shrinking tube 20. This shrinking tube 20 is placed on the outer surface of the crimping, welding and/or soldering part 12 with the sensor S sandwiched between the shrinking tube 20 and the crimping, welding and/or soldering part 12.

Figure 2A:
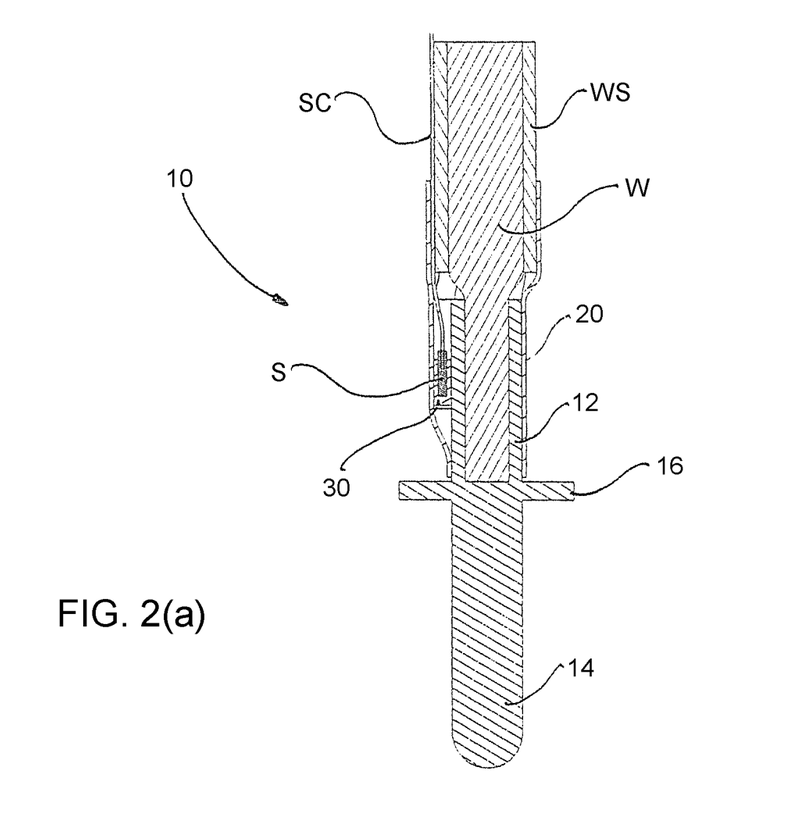
FIG. 2a is a cross sectional view along a longitudinal axis of the terminal fitting and FIG. 2b is a cross sectional view perpendicular to the longitudinal axis of the terminal fitting.
Figure 2B:
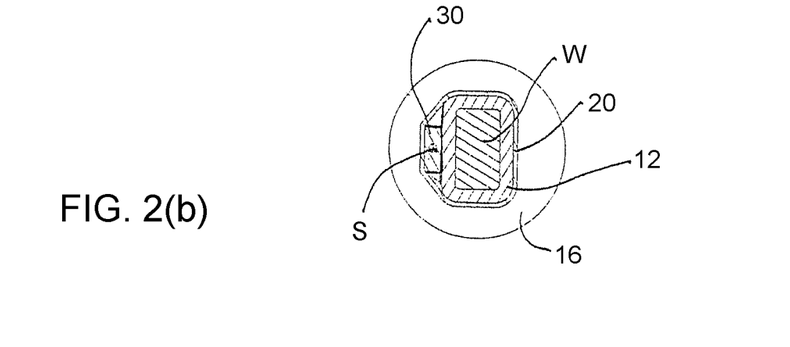

The sensor S may comprise (not shown) an outer sheath (comprising particularly a polytetrafluoroethylene (PTFE) tube such as a Teflon tube) to protect the sensor from external influences e.g. from chemical reagents, humidity or the like. Specifically, a material of the outer sheath may have thermal shrinking properties so that the outer sheath may be shrunk onto the sensor S before arranging the sensor S at or on the terminal fitting 10 (e.g. inserted into a mounting bracket 30, as will be described below in connection with FIGS. 2 and 3). Further specifically, the outer sheath particularly in the form of a tube (e.g. PTFE tube) may be sealed by means of a suitable adhesive so as to be fluid- or waterproof.

By applying heat to the shrinking tube 20 (e.g. by a hot air gun or other source of hot gas or fluid flow), the shrinking tube 20 shrinks and conforms to the size and shape of the substrate (i.e. the terminal fitting and sensor(s)) beneath or inside it thereby providing a good and secure fixing of the sensor S onto the outer surface of the terminal fitting 10, particularly the crimping, welding and/or soldering part 12. While the shrinking tube 20 snugly fits on the outer portion of the terminal fitting and/or sensor, it should be understood that the enclosed Figures for simplicity reasons do not show the full extent of shrinking or snug-fit of the shrinking tube 20. Preferably, the shrinking tube 20 extends toward the wire W or cable so as to at least partly surround the wire sheathing WS. Accordingly, the shrinking tube 20 not only fixes the sensor S onto the crimping, welding and/or soldering part 12, but also provides a fluid- or water-tight connection between the wire sheathing WS and the terminal fitting 10.

The shrinking tube 20 may be made from a thermoplastic material such as polyolefin, fluoropolymer (such as FEP, PTFE or Kynar), PVC, neoprene, silicone elastomer and/or Viton. Specifically, PTFE (fluoropolymer) has a wide operating temperature range from approximately −55° C. to approximately 175° C., a low coefficient of friction and high resistance to chemicals and punctures. Further specifically, Viton has high chemical resistance. Viton is highly flexible and comprises a very wide operating temperature range of approximately −55° C. to approximately 220° C. However, the shrinking tube 20 may also be made from other materials such as PVDF (Polyvinylidene), FEP (Fluorinated Ethylene Propylene), Silicone rubber, Polyolefin, Nylon or PVC (Poly Vinyl Chlorid). The shrinking tube 20 is preferably formed such that it shrinks substantially radially when heated but not longitudinally, to between one-half and one-sixth of the diameter thereof.

Figure 3:
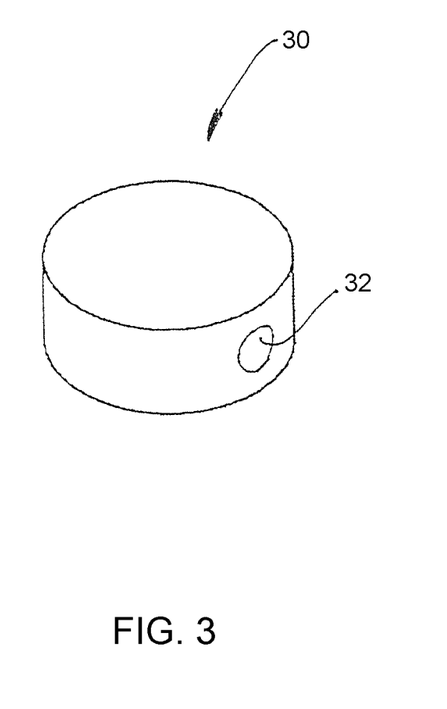
FIG. 3 is a perspective view of a mounting bracket applied in the terminal fitting of FIGS. 2a and 2b.

A second embodiment will now be explained with reference to FIGS. 2a, 2b and 3. The similar or substantially same components as in the first embodiment are designated by the same reference numerals in the second embodiment.

In the second embodiment, the sensor S is also mounted to the terminal fitting 10, particularly to an outer surface of the wire connection portion (particularly the crimping, welding and/or soldering part 12) of the terminal fitting 10. However, a mounting bracket 30, as shown in FIG. 3 is used as a particular thermal (or heat) coupling member to fix or mount the sensor S onto the terminal fitting 10. The mounting bracket 30 particularly is of a substantially circular or disk-shaped form and/or comprises a mounting hole 32 particularly at an outer circumference thereof.

The sensor S at least partly is placed or inserted within the mounting hole 32 of the mounting bracket 30 (and particularly secured therein by press-fitting and/or by means of an adhesive or the like specifically having appropriate thermal conductivity properties) before placing the sensor S onto the terminal fitting 10, particularly the outer surface of the crimping, welding and/or soldering part 12. Accordingly, a safe mounting is ensured while particularly a damage of the sensor S may be prevented during mounting the sensor S and/or during inserting the terminal fitting 10 into an accommodating chamber of a connector housing. Moreover, the mounting bracket 30 as a particular thermal (or heat) coupling member provides a good heat transfer from the terminal fitting 10 to the sensor S (particularly in case the sensor is a thermosensor), as the mounting bracket 30 is made from a material having good thermal conductivity, such as copper (Cu), aluminium (Al) or the like. The invention is not limited to the mounting bracket 30 having the substantially circular or disk-shape form, but the mounting bracket 30 may also have any other form or shape such as a rectangular block (with/without rounded edges), a building block, an elliptic block or the like.

Figure 4A:
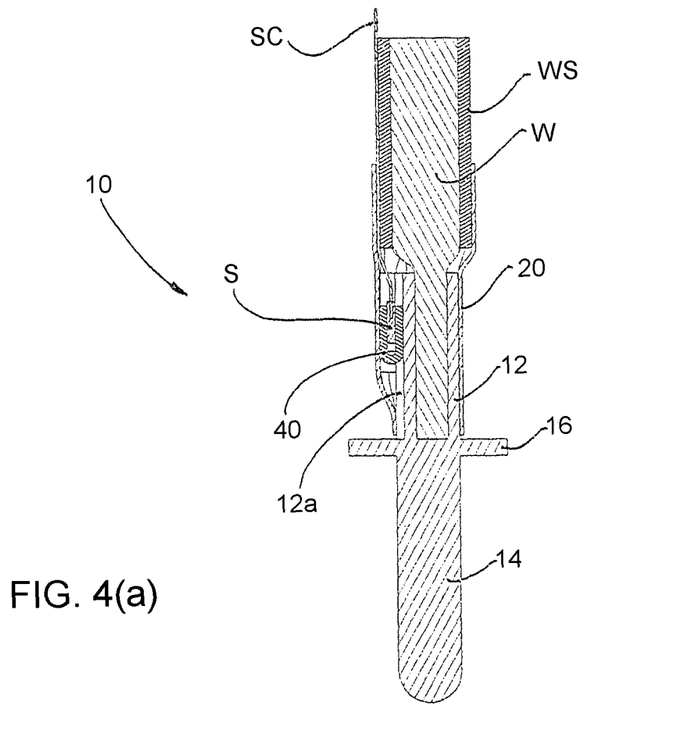
FIG. 4a is a cross sectional view along a longitudinal axis of the terminal fitting and FIG. 4b is a cross sectional view perpendicular to the longitudinal axis of the terminal fitting.

A third embodiment is now described with reference to FIGS. 4a, 4b and 5. The substantially same or similar components as in the first and second embodiments are designated by the same reference numerals in the third embodiment, shown in FIGS. 4a, 4b and 5.

Figure 4B:
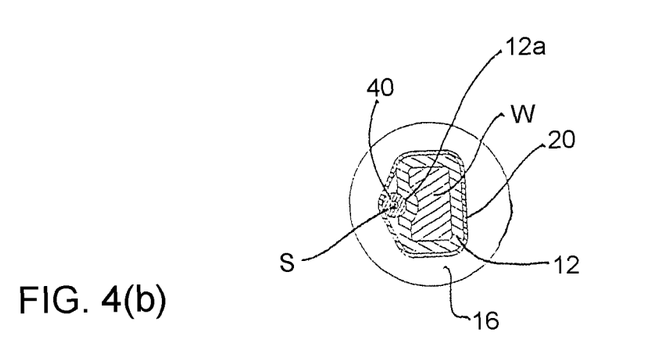
Figure 5:
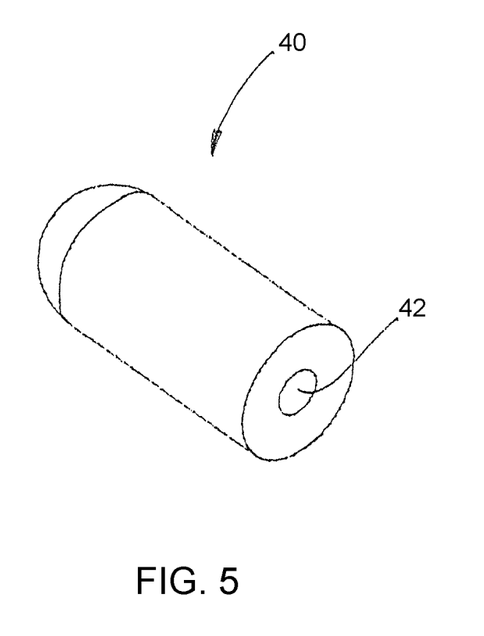
FIG. 5 is a perspective view of a sleeve applied in the terminal fitting of FIGS. 4a and 4b.

In this embodiment, the terminal fitting 10, particularly the crimping, welding and/or soldering part 12, comprises a groove or recess 12a, as shown in FIG. 4b. The groove or recess 12a may be obtained by milling and/or embossing of a corresponding portion of the terminal fitting 10. The sensor S at least partly is placed within a sleeve 40 as a particular thermal (or heat) coupling member particularly substantially having a cylindrical shape (see e.g. FIG. 5). The sleeve 40 particularly has a shape substantially conforming a shape of the groove or recess 12a thereby ensuring as a particular thermal (or heat) coupling member a good heat transfer between terminal fitting 10 and sensor S. Specifically, the cylindrical shape of sleeve 40 particularly substantially has a diameter in correspondence with a radius of curvature of the groove 12a of the crimping, welding and/or soldering part 12, such that a portion of the sleeve 40 contacts substantially the whole surface of groove 12a when being at least partly placed into or arranged in the groove 12a. Further, the sleeve 40 comprises a (particularly bottomed) mounting hole 42 for at least partly inserting the sensor S. The sensor S may be particularly secured in the mounting hole 42 e.g. by means of an adhesive or the like having appropriate thermal conductivity properties. The groove 12a in connection with the sleeve 40 provides an improved positioning of the sensor S as well as an improved thermal conductivity due to a large surface contact between the sleeve 40 and the groove 12a.

Figure 6A:
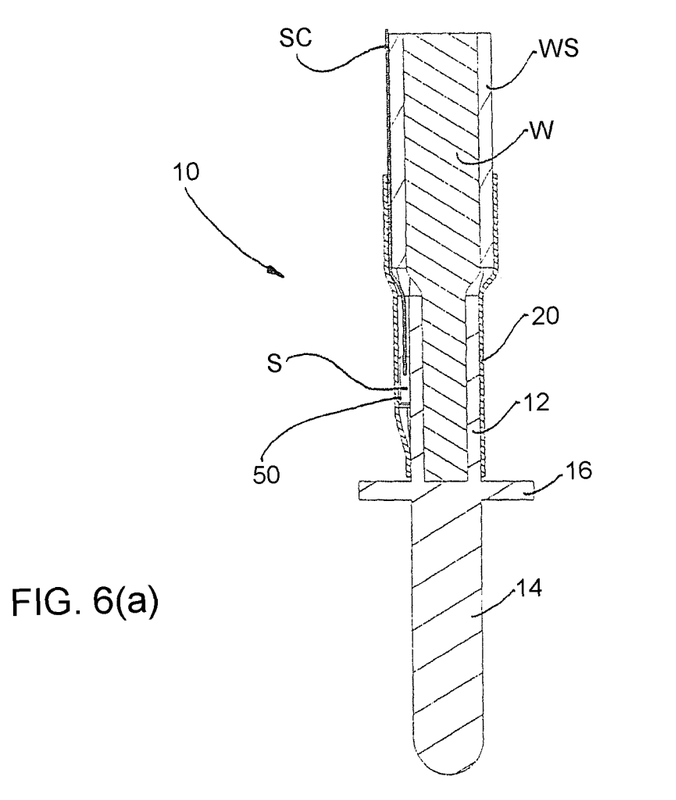
FIG. 6a is a cross sectional view along a longitudinal axis of the terminal fitting and FIG. 6b is a cross sectional view perpendicular to the longitudinal axis of the terminal fitting.
Figure 6B:
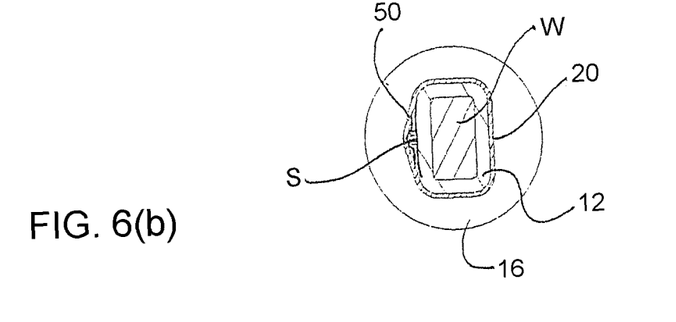
Figure 7:
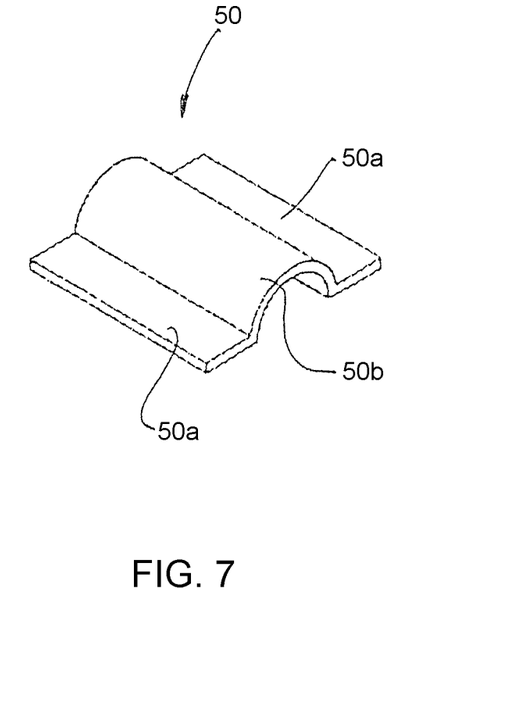
FIG. 7 is a perspective view of a clamp applied in the terminal fitting of FIGS. 6a and 6b.

A fourth particular embodiment is described with reference to FIGS. 6a, 6b and 7. The substantially same or similar components as in the above described embodiments are designated by the same reference numerals in the fourth embodiment shown in FIGS. 6a, 6b and 7. The fourth embodiment comprises a clamp 50 as a particular thermal (or heat) coupling member having a pair of legs 50a, 50a and a curved portion 50b between the pair of legs 50a, 50a. The curved portion 50b has a radius in correspondence with an outer shape of the sensor S so as to provide a big surface contact between sensor S and the curved portion 50b of the clamp 50.

The clamp 50 is preferably made from a material having a good thermal conductivity (e.g. metal), such that the heat produced by the terminal fitting 10 may be easily transferred to the sensor S being displaced between an outer surface of the wire connection portion (particularly the crimping, welding and/or soldering part 12) and the curved portion 50b of the clamp 50 when mounted onto the terminal fitting 10. Moreover, the clamp 50 can protect the sensor S from mechanical forces or impacts acting from outside.

The clamp 50 can easily be manufactured from a metal plate such as a copper plate, an aluminium plate or a steel plate or the like. Moreover, the clamp 50 as a particular thermal (or heat) coupling member ensures a good heat transfer between the terminal fitting 10 and the sensor S by enlarging a contact surface with the terminal fitting 10 and/or sensor S. Moreover, the sensor S can be more stably affixed to the terminal fitting 10 by means of the clamp 50.

Figure 8A:
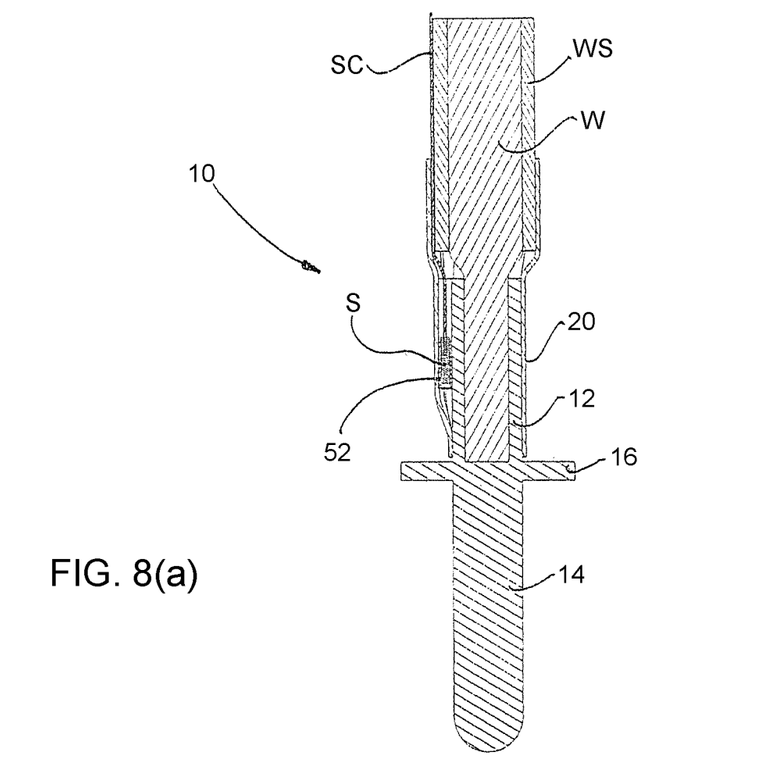
FIG. 8a is a cross sectional view along a longitudinal axis of the terminal fitting and FIG. 8b is a cross sectional view perpendicular to the longitudinal axis of the terminal fitting.
Figure 8B:
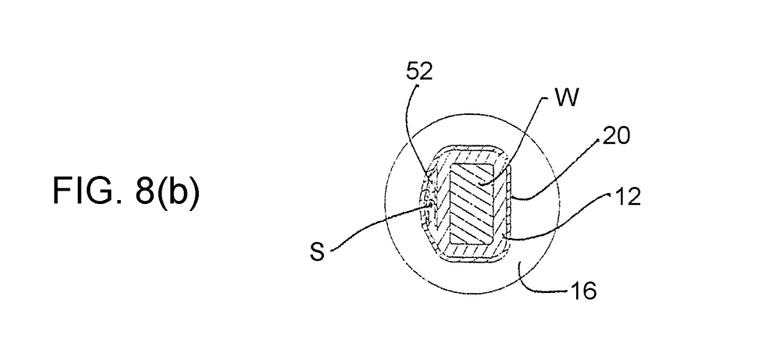
Figure 9:
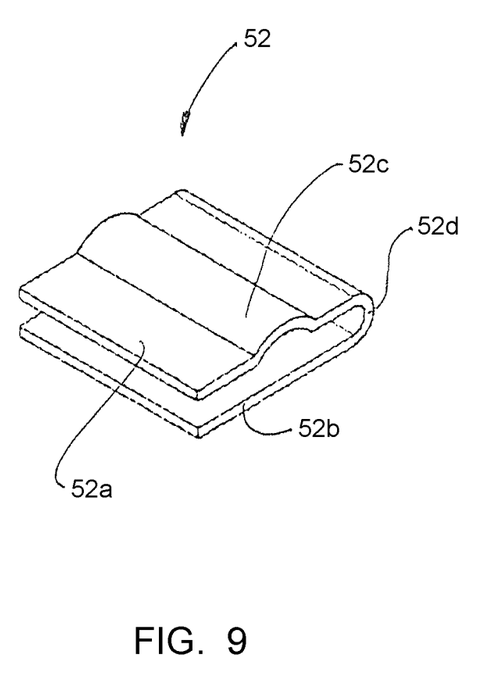
FIG. 9 is a perspective view of a clamp applied in the terminal fitting of FIGS. 8a and 8b.

A fifth embodiment will now be described with reference to FIGS. 8a, 8b and 9. The fifth embodiment comprises a modified clamp 52 as a particular thermal (or heat) coupling member having a curved portion 52c similar to the curved portion 50b of the fourth embodiment. However, the clamp 52 of the fifth embodiment comprises a first leg 52a as well as a second leg 52b extending substantially parallel to the first leg 52a and being connected to the first leg 52a by means of an intermediate portion 52d. The intermediate portion 52d is preferably formed as a bent portion (particularly substantially as a half circular portion) for connecting the first and second legs 52a, 52b.

The first leg 52a and the second leg 52b of the clamp 52 may be arranged on the terminal fitting 10 in such a manner, that the sensor S is clamped by means of the clamp 52 and then mounted and affixed to the terminal fitting 10 by means of the shrinking tube 20. Accordingly, this modified clamp 52 provides the advantage that the sensor S may be prefixed between the first and second legs 52a, 52b before fixing the sensor S by means of the shrinking tube 20 so as to facilitate the operation. Accordingly, clamp 52 is preferably formed of a spring metal material and/or as a leaf spring so as to apply a small spring force onto sensor S when placing the sensor S within the curved portion 52c.

Figure 10A:
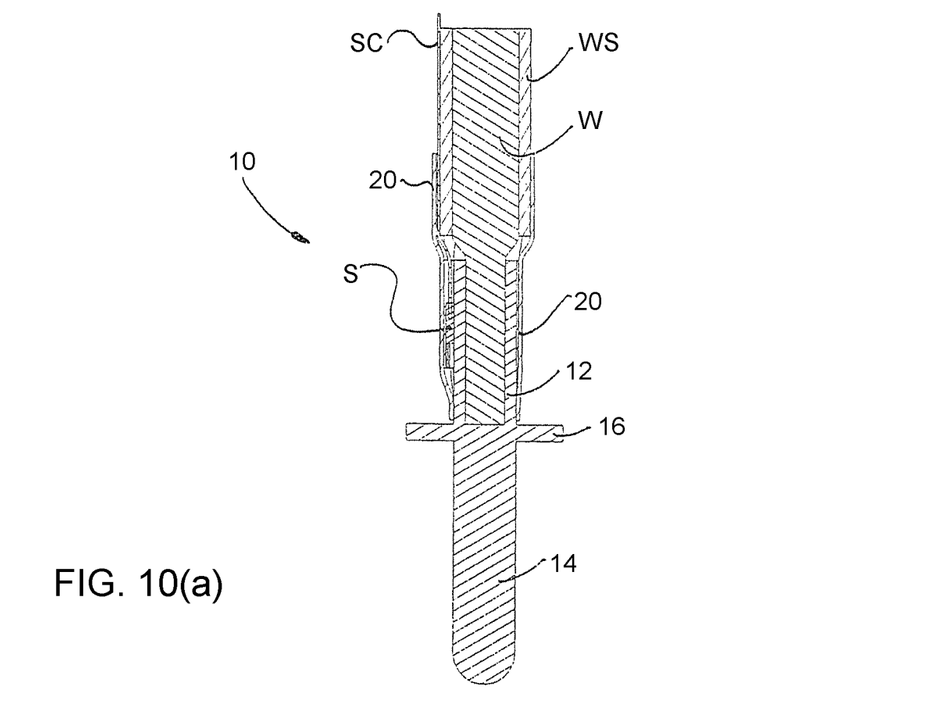
FIG. 10a is a cross sectional view along a longitudinal axis of the terminal fitting and FIG. 10b is a cross sectional view perpendicular to the longitudinal axis of the terminal fitting.
Figure 10B:
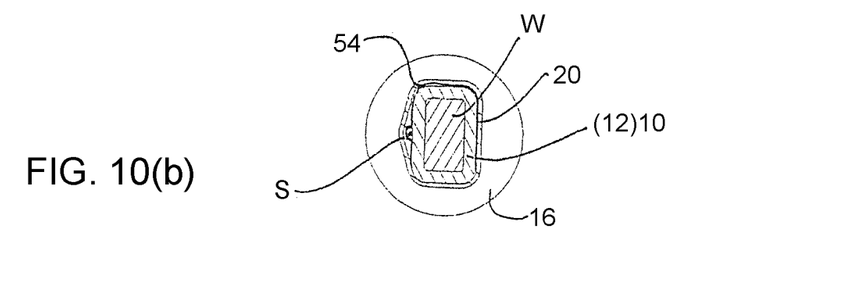
Figure 11:
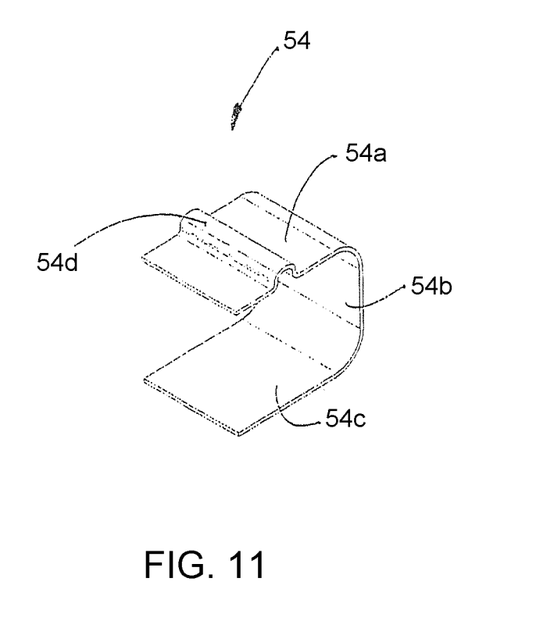
FIG. 11 is a perspective view of a clamp applied in the terminal fitting of FIGS. 10a and 10b.

A sixth embodiment will now be described with reference to FIGS. 10a, 10b and 11. The sixth embodiment comprises a further modified clamp 54 as a particular thermal (or heat) coupling member having a first leg 54a which includes a curved portion 54d as well as a second leg 54b and a third leg 54c. The form and dimension of first, second and third legs 54a, 54b, 54c is configured such that the clamp 54 may be prefixed to the terminal fitting 10, particularly onto the crimping, welding and/or soldering part 12, before arranging or applying the shrinking tube 20 and shrinking it. Accordingly, a prefixing of the sensor S onto the outer surface of the terminal fitting 10, particularly the crimping, welding and/or soldering part 12 may be applied with the further modified clamp 54. Moreover, the further modified claim 54 provides a good thermal conductivity such as the clamps 50 and 52 of the preceding embodiments. Particularly, the first and third legs 54a, 54c may be placed on substantially opposite sides of the outer surface of the terminal fitting 10 (as shown in FIGS. 10a and 10b) thereby allowing to clamp the sensor S onto the surface of the terminal fitting 10 particularly to mechanically fix it thereto.

The sensor S of all of the preceding embodiments is particularly configured as a temperature sensor. By detecting the temperature directly on the outer surface of the terminal fitting 10, a too high temperature of the terminal fitting 10 and of the respective charging connector may be prevented by reducing a charging current in case the temperature of the terminal fitting 10 exceeds a specified (predetermined or predeterminable) threshold value.

Accordingly, high currents may be applied with the charging connector and on the other hand, a too high temperature can be avoided by reducing the charging current in case the upper value is exceeded.

The temperature sensor S is preferably configured as a thermistor such as a NTC (Negative Temperature Coefficient) sensor reducing an electrical resistance thereof when increasing the temperature. However, the temperature sensor may also be configured as a PTC (Positive Temperature Coefficient) sensor exceeding its electrical resistance when increasing the temperature or a PT (Platinum Type) sensor or PTR sensor (Platinum Resistance Thermometer) sensor.

It should be understood that the sensor S may also be provided for any type of measurement other than temperature measurement such as vibration measurement, humidity measurement or the like.

Moreover, it should be understood that according to a particular embodiment plural sensors S (not shown) may be mounted to the terminal fitting 10 by means of the shrinking tube 20 in any one of the above embodiments.

The sensor S is connected or connectable to at least one sensor wire or cable SC having the appropriate configuration (particularly number, specification and/or size of wire(s)) for ensuring the sensing function of the sensor S. Particularly, in case of the sensor S comprising a thermistor probe the cable SC may comprise at least to wires for applying a potential to the thermistor probe.

Figure 12:
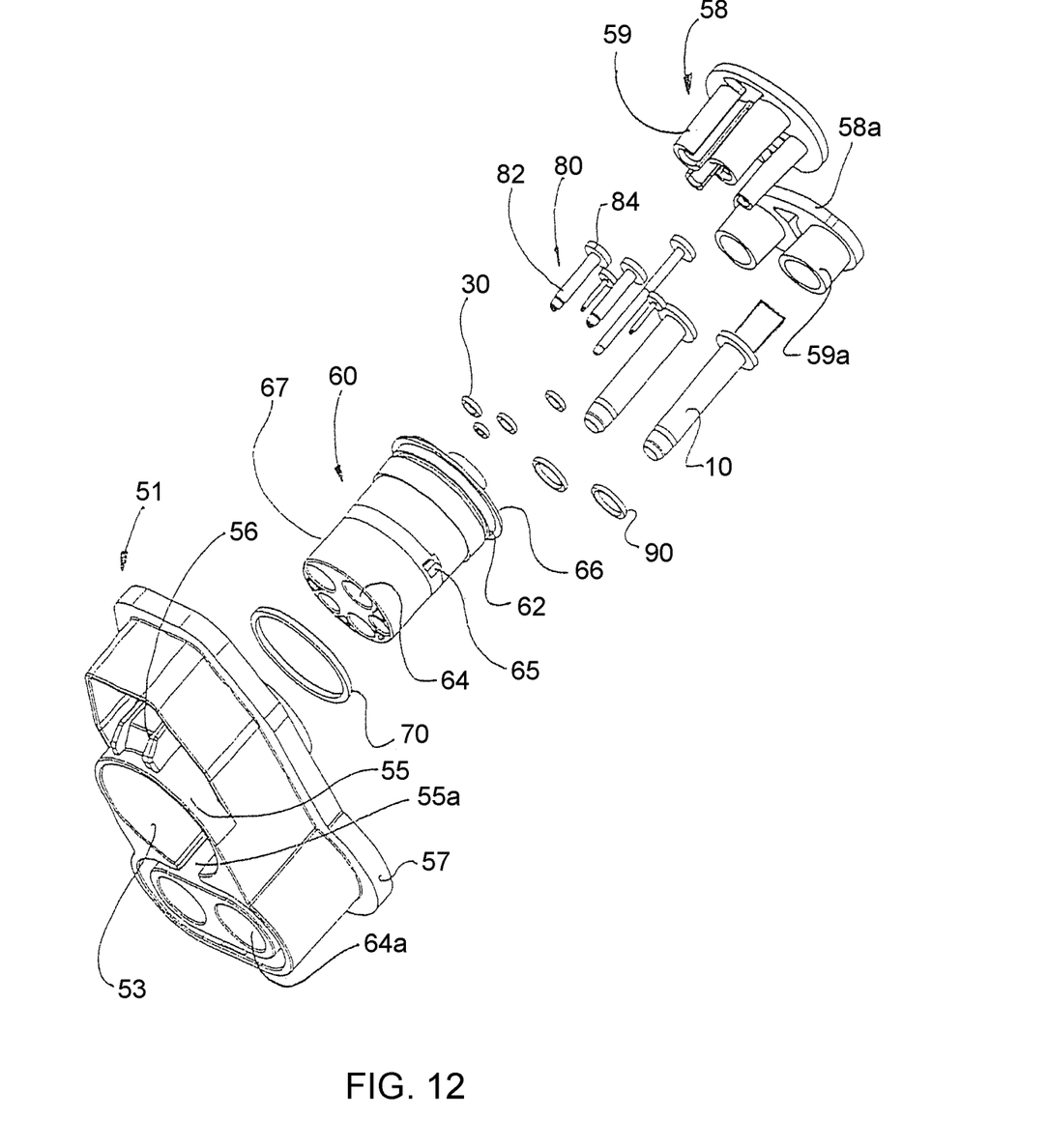
FIG. 12 shows an example of a charging connector having at least one terminal fitting according to any one of the embodiments.

As shown in FIG. 12, an exemplary charging connector is configured as a vehicle-side charging connector and comprises a vehicle-side housing 51 being made e.g. of synthetic resin and/or having a mounting plate 57 to be arranged at an opening edge of a vehicle panel so as to mount the housing 51 of the connector at or in a mounting opening of the vehicle. The mounting plate 57 is preferably provided with a glue or a bonding agent such as Sikaflex® so as to bond and seal the mounting plate 57 to the opening edge of the vehicle panel. Alternatively or additionally, a separate seal may be provided, such as a silicone or rubber made sealing. The mounting plate 57 may also be alternatively or additionally fixed by one or more bolts, clips and/or engaging pawls or the like.

Moreover, the housing 51 is provided with at least one hole or receptacle 53 into which a tower 60 being separately provided can be inserted or mounted from a mounting side, particularly substantially from behind. The tower 60 is made e.g. of synthetic resin similar to the housing 51, wherein it may be provided of a different material e.g. in view of different electric properties (e.g. in view of providing a low current creepage). Preferably, the hole 53 has a sufficient length or axial extension so as to provide a proper or stiff support of the tower 60 such that a tilting thereof can be avoided. The hole 53 particularly has a length of approximately 10% to approximately 30% of the total length of the tower 60 thereby providing a good support.

Particularly, the cross-section of the tower 60 and the mating hole 53 substantially is cylindrical, rectangular or ellipsoid, such that the outer surface of the tower 60 receives an adequate support at the inner surface of the mating hole 53. In the described embodiment, the cross-section is substantially cylindrical which leads to the advantage that the manufacture thereof is facilitated.

Further, the housing 51 is provided with at least one lock projection 56 for locking a lever of a mating charging connector (not shown) provided at an end of an external charging cable or wire harness. This mating charging connector may be formed like the charging connector of EP 2 626 955 A1, which document is incorporated by reference.

The mating charging connector (not shown) to be connected to the vehicle-side charging connector comprises a case body including a connector fitting portion connectable to the vehicle-side connector; a locking portion for holding the vehicle-side connector and the charging connector in a connected state by being locked or interlocked by the lock projection 56 provided on the vehicle-side connector; an unlocking portion capable of canceling a locked state of the locking portion and the lock projection 56; and an unlocking hole formed in the case body at a position substantially corresponding to the unlocking portion, wherein the unlocking portion at least partly projects to the outside of the case body through the unlocking hole and includes at least one recess at a position substantially facing the peripheral edge of the unlocking hole.

According to this construction, a distance from the recess to the peripheral edge of the unlocking hole is longer as compared with the case where no recess is provided. Thus, even if water enters the recess, the action of surface tension is unlikely and water more easily runs down through the recess. Therefore, water does not stay in the recess and interference with an unlocking operation caused by freezing can be avoided.

The tower 60 is provided with at least one accommodating chamber 64 for at least partly accommodating a terminal fitting 80. The terminal fitting 80 particularly is formed of solid copper which may be nickel- and/or silver-plated. The terminal fitting 80 includes at or near a rear side thereof a rear recess into which an end of a charging cable can be inserted and conductively fixed. In the shown embodiment, a plurality of accommodating chambers 64, e.g. five accommodating chambers 64, particularly are provided in the tower 60 so as to at least partly accommodate a corresponding number of terminal fittings 80, e.g. five terminal fittings 80. The terminal fittings 80 are provided with a contact portion 82 at or near a front side thereof and these contact portions 82 at least partly are to be inserted into the accommodating chamber 64 such that the contact portions 82 at least partly are exposed within an exposed portion 64b of the accommodating chamber 64.

Further, at least one terminal fitting 10 to be mounted in an accommodating chamber 64a of the housing 51 is provided with the sensor S, as described above (please note that the sensor S and shrinking tube 20 are not shown in FIG. 12).

Specifically, in context of the present vehicle-side charging connector, there are plural standards which may be met. Specifically, SAE J1772 is a standard having the formal title "SAE Surface Vehicle Recommended Practice J1772, SAE Electric Vehicle Conductive Charge Coupler" and covers the general physical, electrical, communication protocol, and performance requirements for the electric vehicle conductive charge system and coupler. SAE J1772 defines a common electric vehicle conductive charging system architecture including operational requirements and the functional and dimensional requirements for the vehicle inlet and mating connector. Specifically, the SAE J1772 standard defines two charging levels, AC Level 1 (single-phase) 120V, 16 A providing 1.9 kW and AC Level 2 (split-phase) 240 V, 80 A providing 19 kW.

The SAE J1772 committee has also proposed a DC connector based on the SAE J1772-2009 AC connector shape with additional DC and ground pins to support charging at 200-450 V DC and 80 A (36 kW) for DC Level 1 and up to 200 A (90 kW) for DC Level 2. The SAE DC Level 3 charging levels have not been determined, but the standard as it exists as of 2009 has the potential to charge at 200-600 V DC at a maximum of 400 A (240 kW).

Up to now, national technical committee of auto standardization (NTCAS) have organized and drafted 56 electric vehicle standards (38 national standards and 18 automotive industry standards) which have been approved and released by standardisation authorities. In this context, crash safety and potential dangers from on-board high-energy and potential injury to occupants from high-voltage circuit have to be addressed, as e.g. in ECE-R 100. The charging connector described herein particularly is suitable to meet the requirements of SAE J1772 standard and SAE SAE J1772-2009. Furthermore, the charging connector described herein can also be configured to meet the IEC 62196-3 Fdis standard and/or IEC 62196-2 of the International Electrotechnical Commission.

It should be understood, that the present invention can be applied to different types of charging connectors designed for AC charging connectors (e.g. using SAE J1772™ compliant Level 1 & 2 connector) and/or DC charging connectors. Accordingly, the number and/or configuration of the terminal fittings 80 at least partly accommodated in the accommodating chambers 64 of the tower 60 are variable. The tower 60 separate from the housing 51 may comprise only terminal fittings relating to the AC charging, only terminal fittings relating to the DC charging or terminal fittings relating to both AC and DC charging (also referred to as combined charging system (CCS) type). Furthermore, two (or more) towers 60 separate from the housing 51 may be provided, such as a first tower accommodating terminal fittings relating to AC charging and a second tower accommodating terminal fittings relating to DC charging in order to provide a vehicle-side charging connector of the combined charging system (CCS) type.

The invention is not limited to a charging connector mounted in a vehicle but may also be applied to a charging connector of a charging station, power source or the like. Although the charging connector of the above-described embodiment is provided with the tower 60 for accommodating the (small) terminal fittings 80 and the (big) terminal fittings 10 having the sensor S, the invention may also be applied to a charging connector having no tower 60 and/or no small terminal fittings 80 without a sensor, but to a charging connector having a simple housing without a tower and with only one kind of terminal fittings 10 with a sensor S.

LIST OF REFERENCE NUMERALS

10 terminal fitting (with sensor)
12 crimping/welding/soldering part
12*a* groove
14 connecting part
16 stopper
20 shrinking tube
30 mounting bracket
32 mounting hole
40 sleeve
42 mounting hole
50 clamp
50*a* leg
50*b* curved portion
51 housing
52 clamp
52*a* first leg
52*b* second leg
52*c* curved portion
52*d* intermediate portion
53 receptacle or hole
54 clamp
54*a* first leg
54*b* second leg
54*c* third leg
54*d* curved portion
55 circumferential wall
55*a* slit
56 lock projection
57 mounting plate
58 rear cover
58*a* rear cover
59 abutment portion
59*a* abutment portion
60 tower
62 groove
64 accommodating chamber
64*a* accommodating chamber
65 drain opening
66 larger diameter portion
67 small/smaller diameter portion
70 sealing ring (seal member)
80 terminal fitting (without sensor)
82 contact portion
84 flange portion
90 sealing
C coating
S sensor
SC sensor cable
W wire
WS wire sheathing

The invention claimed is:

1. A charging connector for charging a battery installed in a vehicle comprising:
a housing having an accommodating chamber;
a terminal fitting having a connecting part accommodated in the accommodating chamber and a wire connection portion rearward of the connecting part and configured to be connected to a wire;
a thermal coupling mounted in surface contact with an outer surface with the wire connection portion of the terminal fitting;
at least one sensor mounted in the thermal coupling;
a shrinking tube circumferentially surrounding the wire connection portion of the terminal fitting and the thermal coupling that has the sensor mounted therein, the shrinking tube being shrunk and holding the thermal coupling and the sensor against the wire connection portion of the terminal fitting.

2. The charging connector of claim 1, wherein the thermal coupling comprises at least one of a sleeve, a mounting bracket, and a clamp, and wherein the thermal coupling having said sensor being at least partly arranged therein is fixed to the terminal fitting by the at least one shrinking tube.

3. The charging connector of claim 2, wherein the thermal coupling member is made of a material having a good thermal conductivity.

4. The charging connector of claim 1, wherein the sensor is a temperature sensor.

5. The charging connector of claim 4, wherein the temperature sensor is selected from the group consisting of a NTC sensor, a PTC sensor or a PT sensor.

* * * * *